United States Patent [19]

Lichtenberg

[11] 3,861,320

[45] Jan. 21, 1975

[54] ELECTROMAGNETIC TRACK GUIDANCE ARRANGEMENT FOR A VEHICLE

[75] Inventor: Alfred Lichtenberg, Erlangen, Germany

[73] Assignee: Siemens Aktiengesellschaft, Munich, Germany

[22] Filed: Apr. 5, 1974

[21] Appl. No.: 458,419

[30] Foreign Application Priority Data
Apr. 13, 1973 Germany............................ 2318756

[52] U.S. Cl. ........................... 104/130, 104/148 MS
[51] Int. Cl............................................ E01b 25/08
[58] Field of Search...104/148 LM, 148 SS, 148 MS, 104/130

[56] References Cited
UNITED STATES PATENTS

| | | | |
|---|---|---|---|
| 3,621,788 | 11/1971 | Bertin | 104/134 |
| 3,643,600 | 2/1972 | Bertin | 104/134 |
| 3,797,402 | 3/1974 | Karch | 104/130 |

Primary Examiner—M. Henson Wood, Jr.
Assistant Examiner—Richard A. Bertsch
Attorney, Agent, or Firm—Kenyon & Kenyon Reilly Carr & Chapin

[57] ABSTRACT

An improved arrangement for use in a switch area of an electromagnetic guidance system such as a magnetic suspension railroad in which current carrying conductor loops are arranged symmetrical to the travel axis and used for the lateral guidance of the vehicle when traveling through the switch. Two individually controlled loops are provided, one for straight ahead travel and the other for traveling off onto the branch at the switch with the conductor loops in addition to providing guidance forces, also providing lifting forces within the switch area.

2 Claims, 4 Drawing Figures

ELECTROMAGNETIC TRACK GUIDANCE ARRANGEMENT FOR A VEHICLE

BACKGROUND OF THE INVENTION

This invention relates to magnetic suspension systems in general and more particularly to an improvement in a magnetic suspension railroad of the type in which a vehicle having d-c current carrying loops installed therein travels over a roadbed on which reaction members are mounted with the conductor loops cooperating with the reaction members for generating lifting and/or lateral guidance forces.

One type of magnetic suspension railroad is disclosed in German Pat. 707,032. In the railroad disclosed therein, lifting and track guidance forces required for suspension are generated by electromagnets arranged in the vehicle, which interact with stationary iron rails on the roadbed. In order to select travel direction at a switch, one of the rows of electromagnets, which are arranged on both sides of the vehicle, is disconnected so that the vehicle is then only guided by the attraction forces of the lateral guidance magnets arranged on one side along with the forces of the suspension system for track guidance acting in the opposite direction. In a design such as this, current in the conductor loops of the electromagnets which are mounted on the vehicle must be continuously regulated using converters responsive to distance control equipment in order to maintain a predetermined distance between the electromagnets and the stationary iron rails. With this arrangement, effective, sufficiently large attraction forces can be exerted in the direction of the lateral guidance magnets, but only small counterforces are provided by the suspension system in the opposite direction, the lifting forces being reduced with increasing excursion. As a result, safe guidance of the vehicle is not assured for all operating conditions.

In another system disclosed in German Auslegeschrift 2,140,103, a magnetic suspension railroad is described in which guidance in the switch area is obtained using electromagnets energized on one side of the vehicle, which co-act, for example, with stationary permanent electromagnets on the roadbed. Either the polarity of the vehicle electromagnets or that of the stationary magnets can be changed in this system such that attraction and repulsion forces are alternatingly exerted. In order to change polarity in this manner, special devices on the vehicle or on the roadbed in the switch area are thus required.

Thus, it can be seen that these previously developed guidance systems for use in a switch area can become quite costly and do not necessarily maintain the required safe guidance. Thus, it can be seen that there is a need for a simpler and less costly arrangement. In particular, an arrangement in which devices for repeatedly changing the polarity of electromagnets is eliminated, wherein sufficiently large guidance forces can be generated in both lateral directions without impairing the lifting functions of the suspension arrangement, and which is not overly costly is needed.

SUMMARY OF THE INVENTION

The present invention provides a system meeting this need, essentially by placing in the area of the switch at least one stationary conductor loop, which is capable of being connected to a d-c source in order to select direction of travel. The loop is arranged symmetrically in each of the travel axes, with the long side of the current carrying conductor loops disposed such that they are vertically and horizontally displaced, with respect to the current-carrying long sides of the conductor loops in the vehicle during the time the vehicle is within the switch area. Current is caused to flow in the conductor loops in a direction opposite to that flowing in the conductor loops in the vehicle. As a result, repulsion forces are generated between the current carrying conductors in the vehicle and those in the switch area to produce track guidance without alternatingly changing the attraction and propulsion forces and without the need for the use of distance control devices. Thus, through the use of a greatly simplified arrangement control guidance in the switch which is safe and also results in quite running is obtained. The horizontal displacement of the long sides of the conductor loops generates repulsive lateral guidance forces with the vertical displacement used to generate lateral guidance and lifting forces simultaneously. By adjustment of the degree of vertical displacement, the ratio of the lateral guidance forces to lifting forces can be controlled. This permits, for example, controlling in a simple manner the inclination of the vehicle in curves to thereby cancel centrifugal forces resulting in such curves.

DETAILED DESCRIPTION OF THE PREFERRED EMBODIMENT

Figure 1:
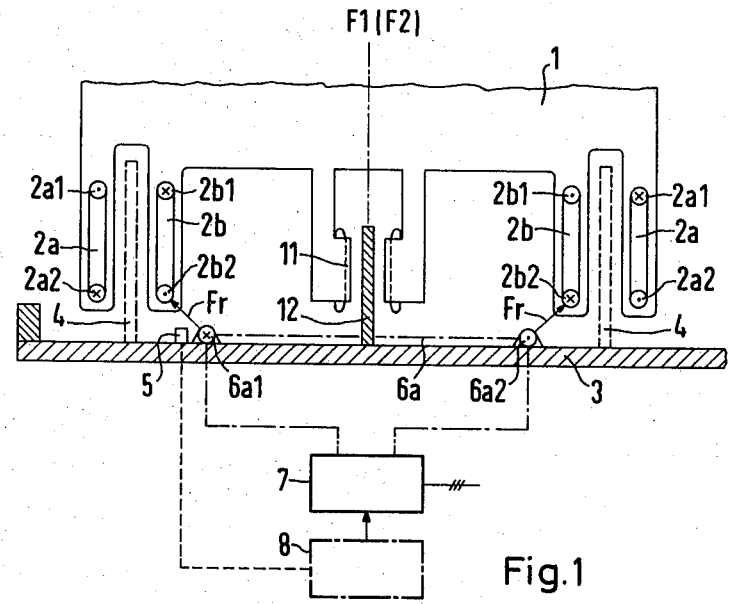
FIG. 1 is a cross sectional view through a vehicle supported above a roadbed in the area of a switch.

FIG. 1 illustrates a vehicle 1 suspended above a roadbed 3. The vehicle has installed within it on both sides, superconducting conductor loops designated 2a and 2b arranged vertically and carrying current flowing in opposite directions. Situated on the roadbed below the long sides 2a2 and 2b2 of the conductor loops 2a and 2b is a continuous electrical conductor plate 3 which generates lifting forces by interaction with the current-carrying conductor loops 2a and 2b when the vehicle is in motion. In areas other than switch areas, i.e., on straight sections of track, lateral guidance is obtained through the interaction of the two conductor loops 2a and 2b with non-ferromagnetic conductor plates 4 extending vertically from the roadbed as shown in dotted lines. Propulsion is generated by a linear motor having winding carriers 11 on the vehicle which react with a reaction rail 12 on the roadbed.

Figure 2:
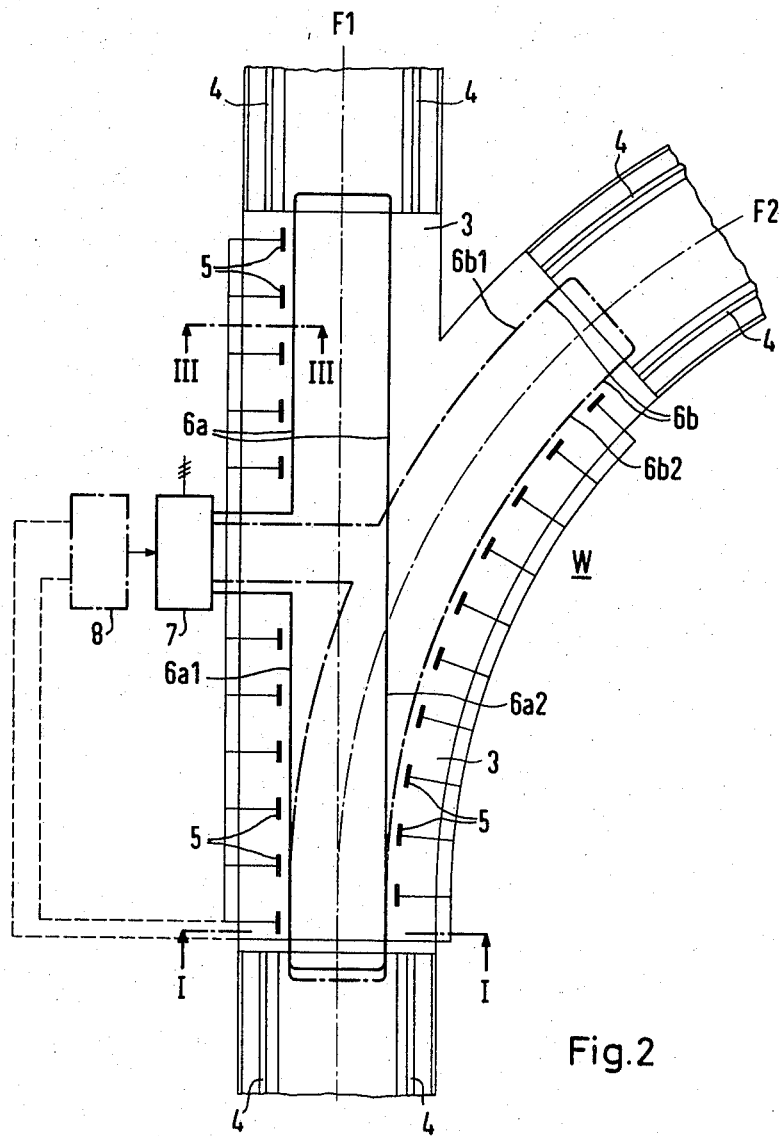
FIG. 2 is a plan view of the switch area.

As can be seen by reference to both FIGS. 1 and 2, associated with the superconducting conductor loops 2a and 2b in the vehicle 1, in the area of the switch W are located stationary conductor loops 6a and 6b. As illustrated, one conductor loop 6a is associated with the straight track as defined by the axis F1 and a second conductor loop 6b associated with the curved portion of the switch as defined by an axis designated F2. The loops 6a and 6b are adapted to be selectively connected to a d-c source 7 in order to select the direction of travel. That is, if straight travel is desired, the loop 6a will be energized by the d-c source 7 and for curved travel, the loop $6b$ will be energized. The conductor loops $6a$ and $6b$ are arranged symmetrically about their respective axes $F1$ and $F2$ and located on the roadbed such that their long sides $6a1$, $6a2$, $6b1$, and $6b2$ respectively, are disposed opposite long sides $2b2$ of the current carrying conductor loops in the vehicle. As indicated by the crosses and dots on the figure, current flow in the loops $6a$ and $6b$ is opposite to the current flow in the loops $2b2$ with which they are associated. Also, as illustrated by FIG. 1, the conductor loops $6a$ and $6b$ have their long sides $6a1$, $6a2$, $6b1$ and $6b2$ vertically and horizontally displaced with respect to the long sides $2b2$ of the conductor loops in the vehicle. As is evident from an examination of FIG. 1, this results in a mirror-like symmetrical arrangement.

Figure 3:
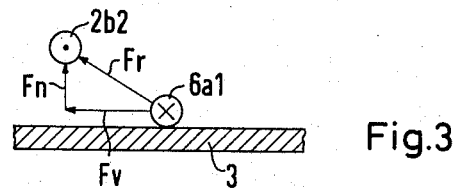
FIG. 3 is a cross sectional view illustrating the forces between the conductor loops having oppositely flowing currents.

The forces generated by this arrangement are illustrated by the diagram of FIG. 3. In the triangle of forces shown thereon, the horizontal force component resulting from the repulsion forces generated between the conductor loops $2b2$ and $6a1$ in which current is flowing in opposite directions is designated as $Fv$. The vertical force component is designated as $Fn$ and the resulting force as $Fr$. It will be recognized that the other long sides $2a1$, $2b1$ and $2a2$ will have some effect on the overall resulting forces. However, because of their greater distance from the side $6a1$, these forces will be considerably smaller and have been neglected on the force diagram of FIG. 3. The horizontal forces $Fv$ active on both sides of the vehicle are opposite to each other and thereby maintain lateral guidance of the vehicle.

Since it is possible for external disturbing forces in the guidance system to produce oscillations, means are also shown in FIG. 1 to control the current in the conductor loops $6a$ and $6b$ in order to stabilize such oscillations. Thus, there are shown a plurality of distance sensors 5 which provide inputs to a control device 8 which in turn controls the current output of the d-c source 7 such as to damp out any oscillations occuring.

Figure 4:
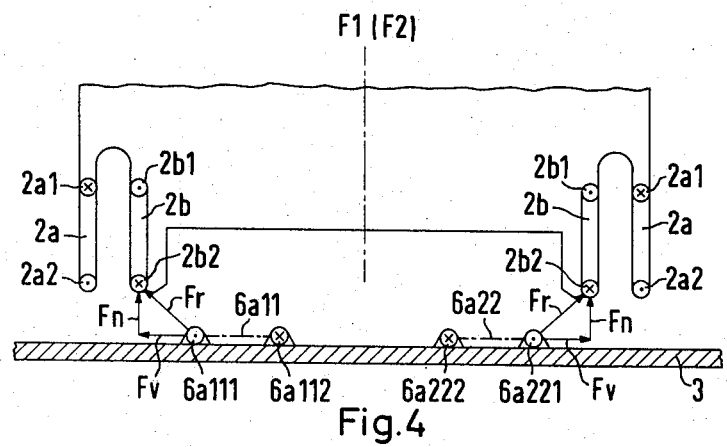
FIG. 4 is a cross sectional view similar to that of FIG. 1 illustrating a further embodiment of the invention.

A further embodiment of the invention is illustrated on FIG. 4. In this embodiment, one or more conductor loops are placed in a mirror-like symmetrical arrangement on each side of the travel axis. In the illustrated embodiment, a conductor loop designated $6a11$ is provided on one side of the travel axis and a second conductor loop $6a22$ on the other side. In this arrangement, the long sides $2b2$ of the conductor loops in the vehicle are again located opposite to the long sides $6a221$ and $6a111$ of the two conductor loops. As illustrated by the force diagram on FIG. 4, forces essentially the same as those described in connection with FIG. 3 are thereby generated, resulting in repulsion forces in both the horizontal and vertical directions. A primary advantage of this arrangement is in the ability to independently adjust the lateral guidance forces $Fv$ and lifting forces $Fn$ on each side of the travel axis $F1$. In this way, the vehicle may be caused to be tilted. As noted above, such tilting may be particularly desired in curved areas to counteract centrifugal forces.

Horizontal displacement of the conductor loops $6a$ and $6b$ in the switch W relative to the long sides $2b2$ of the conductor loops of the vehicle which interact with them, and vertical displacement downward so that the conductor loops of the vehicle and the conductor loops in the switch are separated from each other by an air gap which extends essentially parallel to the track in the manner shown is advantageous. Through this arrangement, structures extending into or above the track are avoided and it is possible without the use of moving parts to provide for lateral guidance on both sides of the vehicle while in the switch area so that the vehicle can be guided in a manner safer than was heretofore possible.

Thus, an improved guidance arrangement for use in switches in a magnetically suspended railroad has been shown. Although specific embodiments have been illustrated and described, it will be obvious to those skilled in the art that various modifications may be made without departing from the spirit of the invention which is intended to be limited solely by the appended claims.

What is claimed is:

1. In an electromagnetic track guidance arrangement for a vehicle and which includes installed within the vehicle d-c current carrying conductor loops which react with stationary reaction members installed on the roadbed to generate at least one of a lifting and a lateral guidance force, an improved arrangement for selecting the direction of travel at a switch while maintaining lateral guidance comprising:
   a. at least one stationary conductor loop installed in the area of the switch and having long sides disposed opposite the long sides of the conductor in the vehicle when the vehicle is in the switch with the direction of current in the vehicle conductor loops opposite to the direction of current in the conductor loops on the roadbed;
   b. a d-c source adapted to be selectively connected to said at least one stationary conductor loop; and
   c. wherein the long sides of said conductor loop are vertically and horizontally displaced with respect to the long sides of said vehicle conductor loops.

2. The arrangement according to claim 1 wherein the conductor loops on the roadbed and the long sides of the conductor loops are separated from each other by an air gap essentially parallel to the track.

* * * * *